US011210485B2

(12) United States Patent
Brock

(10) Patent No.: US 11,210,485 B2
(45) Date of Patent: Dec. 28, 2021

(54) COMBINED AIMING AND VISUAL DECODE RESULT SYSTEM

(71) Applicant: ZEBRA TECHNOLOGIES CORPORATION, Lincolnshire, IL (US)

(72) Inventor: Christopher W. Brock, Manorville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 92 days.

(21) Appl. No.: 16/692,076

(22) Filed: Nov. 22, 2019

(65) Prior Publication Data

US 2021/0157997 A1 May 27, 2021

(51) Int. Cl.
*G06K 7/10* (2006.01)
*G06K 7/14* (2006.01)

(52) U.S. Cl.
CPC ..... *G06K 7/10732* (2013.01); *G06K 7/10831* (2013.01); *G06K 7/1413* (2013.01)

(58) Field of Classification Search
CPC .......... G06K 7/10732; G06K 7/10831; G06K 7/1413
USPC ............ 235/462.06, 462.04, 462.14, 462.17, 235/462.42
See application file for complete search history.

(56) References Cited

U.S. PATENT DOCUMENTS

| 8,027,096 B2* | 9/2011 | Feng | G02B 3/12 359/666 |
| 8,556,179 B2* | 10/2013 | Gillet | G06K 7/12 235/462.25 |
| 11,093,723 B2* | 8/2021 | Feng | G06K 7/1404 |
| 2007/0108284 A1* | 5/2007 | Pankow | G06K 7/10851 235/454 |
| 2009/0194589 A1* | 8/2009 | Moon | G06K 19/06084 235/454 |

* cited by examiner

*Primary Examiner* — Seung H Lee
(74) *Attorney, Agent, or Firm* — Yuri Astvatsaturov

(57) ABSTRACT

A barcode reader includes an illumination assembly configured to illuminate a target; an imaging assembly configured to capture an image of the target, and a visual indicator assembly that includes: a projection lens; a first light source configured to emit first color light through the projection lens to project an aim pattern onto the target; a second light source configured to emit second color light through the projection lens to project a visual indicator onto the target; and an optical element configured to direct the light from both the first light source and the second light source to the projection lens. A memory and a processor of the barcode reader are configured to cause the first light source to emit light prior to the imaging assembly capturing the image; and cause the second light source to emit light subsequent to the processor successfully decoding a symbology in the captured image.

14 Claims, 3 Drawing Sheets

COMBINED AIMING AND VISUAL DECODE RESULT SYSTEM

BACKGROUND OF THE INVENTION

Some barcode readers provide an indication of whether a scanned barcode has been successfully decoded or not. If the scanned barcode is not successfully decoded, the user must scan the barcode again. When a user knows that the scanned barcode has been successfully decoded, the user can move on to scanning a subsequent barcode, or otherwise go about their business.

Barcode readers may be configured to beep or otherwise audibly indicate that a barcode has been successfully decoded. However, in a loud environment (e.g., an inventory environment such as a warehouse), a user may be unable to hear a beep or other audible indication. Additionally, an audible indication is not useful for hearing-impaired users. Some barcode readers address this issue by including an optical system to provide a visual indication of a successfully decoded barcode. However, many barcode readers already include an aiming optical system configured to project an "aim dot" onto a target so that users know where the imager of the barcode reader is aiming before they use the barcode reader to capture an image of the target. Consequently, the visual indication of the successfully decoded barcode needs to be distinguishable from the aim dot so as not to be confusing to users, e.g., in a different color than the aim dot. Generally speaking, however, providing multiple visual indications in different colors typically requires multiple optical systems, e.g., one light source for each color, and one optical system for each light source.

Adding an additional optical system requires a substantial amount of additional physical space within the housing of a barcode reader, and is practically impossible to implement in low profile or smaller barcode readers, such as, e.g., the Zebra® SE4710 OEM 2D imager, that do not have enough physical space for two optical systems. Accordingly, there exists a need for a low-profile barcode reader that can provide both an aim dot and visual indication of a successfully decoded barcode.

SUMMARY

In one aspect, the present disclosure provides a barcode reader, comprising: an illumination assembly configured to illuminate a target; an imaging assembly configured to capture an image of the target; a visual indicator assembly, wherein the visual indicator assembly includes: a projection lens; a first light source, having a first color, configured to emit a first light through the projection lens to project an aim pattern onto the target; a second light source, having a second color, configured to emit a second light through the projection lens to project a visual indicator onto the target; and an optical element configured to direct the first light from the first light source to the projection lens and configured to direct the second light from the second light source to the projection lens; a memory configured to store computer executable instructions; and at least one processor configured to interface with the illumination assembly, the imaging assembly, the visual indicator assembly, and the memory, and configured to execute the computer executable instructions to cause the at least one processor to: cause the first light source to emit light prior to the imaging assembly capturing the image of the target; and cause the second light source to emit light subsequent to the at least one processor successfully decoding a symbology in the captured image.

In another aspect, the present disclosure provides a barcode reader, comprising: an illumination assembly configured to illuminate a target; an imaging assembly configured to capture an image of the target; a visual indicator assembly, wherein the visual indicator assembly includes: a projection lens; a first light source configured to emit a first light through the projection lens to project an aim pattern onto the target; a second light source configured to emit a second light through the projection lens to project a visual indicator onto the target; and an optical element configured to direct the first light from the first light source to the projection lens and configured to direct the second light from the second light source to the projection lens, wherein the visual indicator includes an aperture on a light path of the second light; a memory configured to store computer executable instructions; and at least one processor configured to interface with the illumination assembly, the imaging assembly, the visual indicator assembly, and the memory, and configured to execute the computer executable instructions to cause the at least one processor to: cause the first light source to emit light prior to the imaging assembly capturing the image of the target; and cause the second light source to emit light subsequent to the at least one processor successfully decoding a symbology in the captured image.

In still another aspect, the present disclosure provides a method of operating a barcode reader comprising, emitting a first light prior to an imaging assembly capturing an image of a target appearing within a field of view (FOV) of the barcode reader, the first light having a first optical characteristic; emitting a second light subsequent to the imaging assembly capturing the image of the target appearing within the FOV of the barcode reader, the second light having a second optical characteristic that is different from the first optical characteristic, the first light being emitted from a first light source and being passed from the first light source to a projection lens via an optical element, the second light being emitted from a second light source and being passed from the second light source to the projection lens via the optical element, the optical element being configured to direct the first light from the first light source to the projection lens and configured to direct the second light from the second light source to the projection lens.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
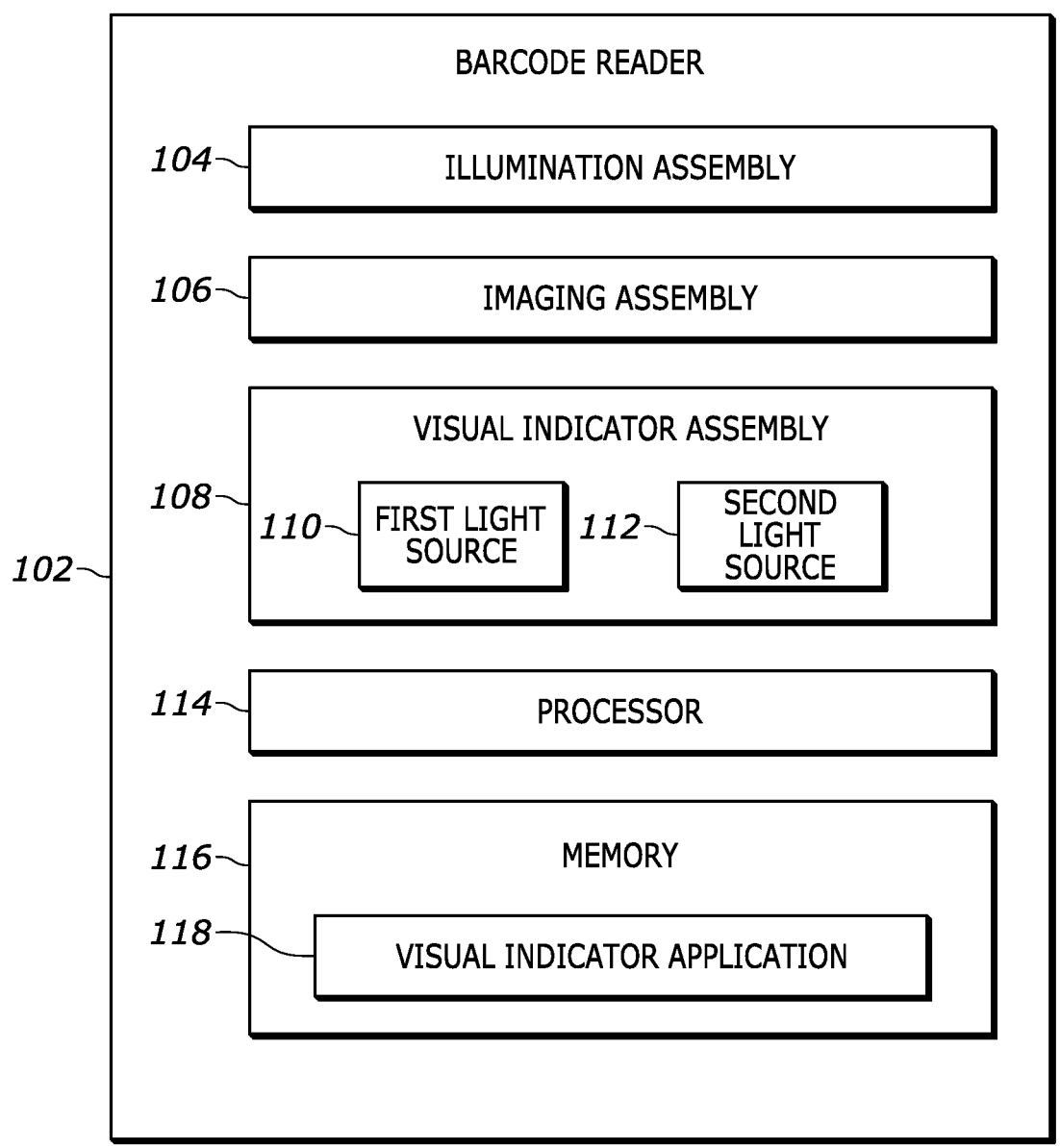
FIG. 1 illustrates an exemplary block diagram schematic of a barcode reader, in accordance with an embodiment of the present invention.

The apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As discussed above, there exists a need for a low profile barcode reader that can provide both an aim dot and visual indication of a successfully decoded barcode. Generally speaking, light-emitting diode (LED) aiming systems used in low profile barcode readers typically include a lens system that provides an "aim dot" by projecting an image of an aperture in front of a powerful LED via a projection lens. Typically, a second LED system, including both a second LED and a second projection lens, would be required to provide another projection in another color. The present disclosure provides a combined visual indicator system that includes an optical combination element on the LED side of the aperture that allows two separate LEDs in different colors to share the same projection lens, i.e., to provide both an aim dot and visual indication of a successfully decoded barcode in two different colors. In some examples, the two separate LEDs may be the same color, and the visual indicator system may include an aperture having a particular shape such that the light path of one of the LEDs passes through the aperture and the light path of the other LED does not pass through the aperture, causing light from the LED associated with the shaped aperture to be projected in the shape. For instance, the aperture could be shaped like a check mark, or an "X", so that the light from the LED associated with the shaped aperture is projected in a check mark shape or an "X" shape, while the light from the other LED is projected in a different shape. Advantageously, because there is no second projection lens (or second LED system) required, the combined visual indicator system of the present disclosure occupies much less space than the combined space required for the first and second LED systems that would typically be used to provide two projections in two different colors or having two different shapes, allowing the combined visual indicator system of the present disclosure to fit in a low profile barcode reader as needed.

Referring now to the drawings, FIG. 1 illustrates an exemplary block diagram schematic of a barcode reader 102, in accordance with an embodiment of the present invention. As shown in FIG. 1, the barcode reader 102 may include an illumination assembly 104, an imaging assembly 106, a visual indicator assembly 108 including a first light source 110 and a second light source 112, one or more processors 114 and one or more memories 116. The illumination assembly 104 may include one or more illumination sources configured to illuminate a target (e.g., a barcode) to be decoded. The imaging assembly 106 may include one or more sensors or cameras configured to capture an image of the target to be decoded.

As discussed above, the visual indicator assembly 108 may include a first light source 110 and a second light source 112. In some examples, the visual indicator assembly 108 may include more than two light sources (not shown). In some examples, each of the light sources 110 and 112 may be configured to project light in a different color, while in other examples, the light sources 110 and 112 may be configured to project light having the same colors or similar colors. In some examples, the first light source 110 and the second light source 112 may be LED light sources. Moreover, in some examples, the first light source 110 and the second light source 112 are each configured to emit light having a brightness of 10 lumens or greater.

Figure 2:
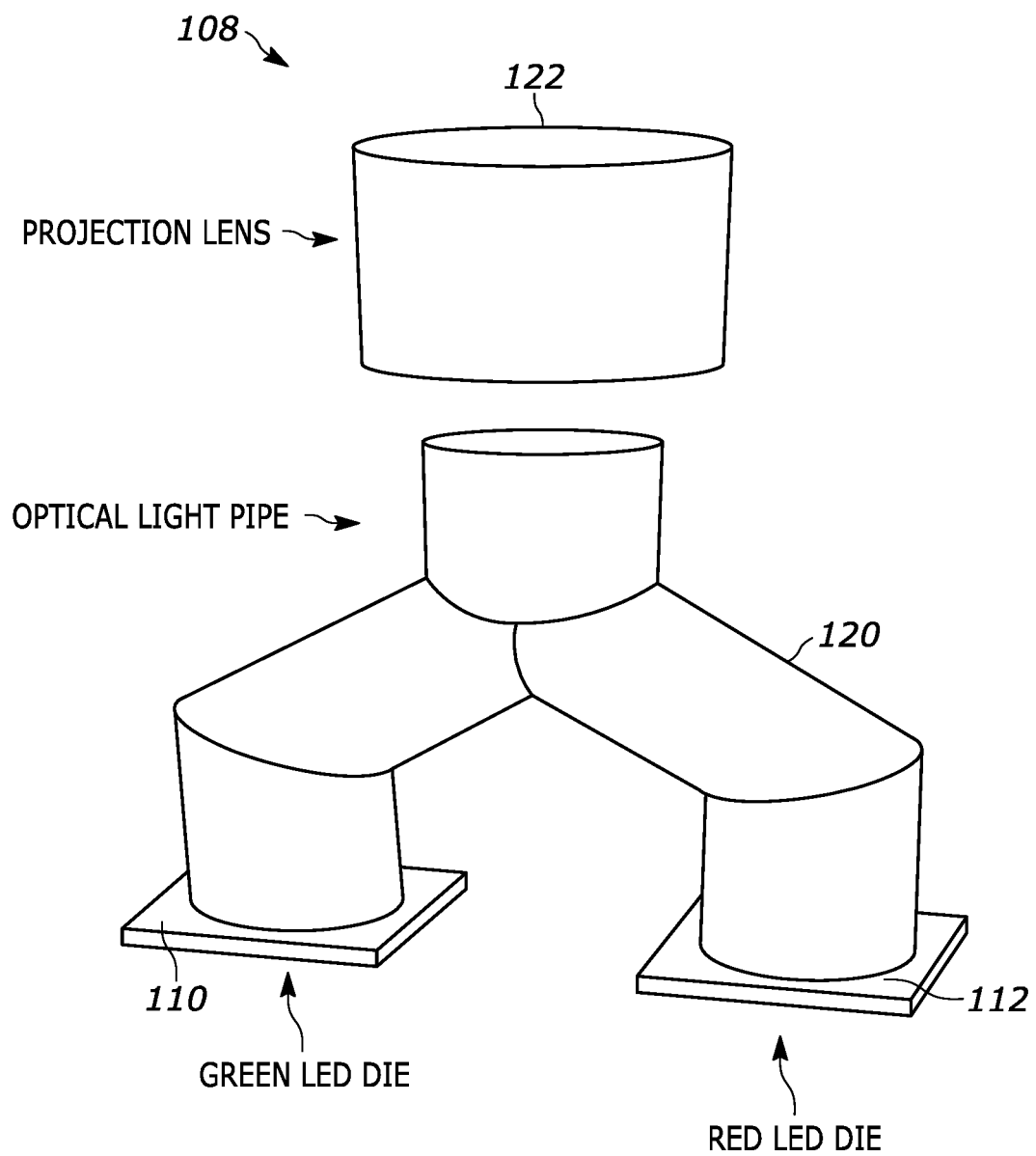
FIG. 2 illustrates an exemplary combined visual indicator assembly, in accordance with an embodiment of the present application.

FIG. 2 illustrates an example visual indicator assembly 108 in greater detail. As shown in FIG. 2, the first light source 110 is a green LED die, and the second light source 112 is a red LED die, however, the first light source 110 and the second light source 112 may be different colors (e.g., other than red and green) in various embodiments, or may be the same colors in some embodiments. FIG. 2 further illustrates that the visual indicator assembly 108 includes an optical element 120 and a projection lens 122. As shown in FIG. 2, the optical element 120 may be configured to direct light from both the first light source 110 and the second light source 112 to the projection lens 122. Accordingly, in some examples the first light source 110 may be configured to emit a first light through the projection lens (e.g., through an aperture of the projection lens) to project an aim pattern onto the target (in a first color, e.g., green), while the second light source 112 may be configured to emit a second light through the projection lens (e.g., through the aperture of the projection lens) to project a visual indicator onto the target (in a second color different from the first color, e.g., red). In some examples, the projection lens may include two apertures having different shapes, and the first light source 110 may be configured to emit a first light through a first aperture of the projection lens having a first shape, while the second light source 112 may be configured to emit a second light through a second aperture of the projection lens having a second shape (different from the first shape), such that the first light source projects an aim pattern having a first shape onto the target while the second light source projects a visual indicator having a second shape onto the target. For instance, the first shape may be a circle shape while the second shape is an "X" shape or a check mark shape.

In particular, the light emitted by the first light source 110 may have a first light path with a first axis, and the light emitted by the second light source 112 may have a second light path with a second axis, and the optical element redirects the light path of the first light and the light path of the second light such that upon passage through the optical element, the first axis and the second axis are substantially coaxial.

Referring back to FIG. 1, the barcode reader 102 may further include a number of various software applications stored in the one or more memories 116, such as a visual indicator application 118. Each of the various software applications may be executed on the same processor 114 or on different processors, in various embodiments. Generally speaking, one or more of the applications may perform at least a portion of any of the method 300 shown in FIG. 3. For example, the visual indicator application 118 may perform one or more functions related to, inter alia, operating a barcode reader implementing a combined visual indicator assembly, e.g., as discussed below with respect to FIG. 3. Additional or alternative applications may be included in various embodiments.

Figure 3:
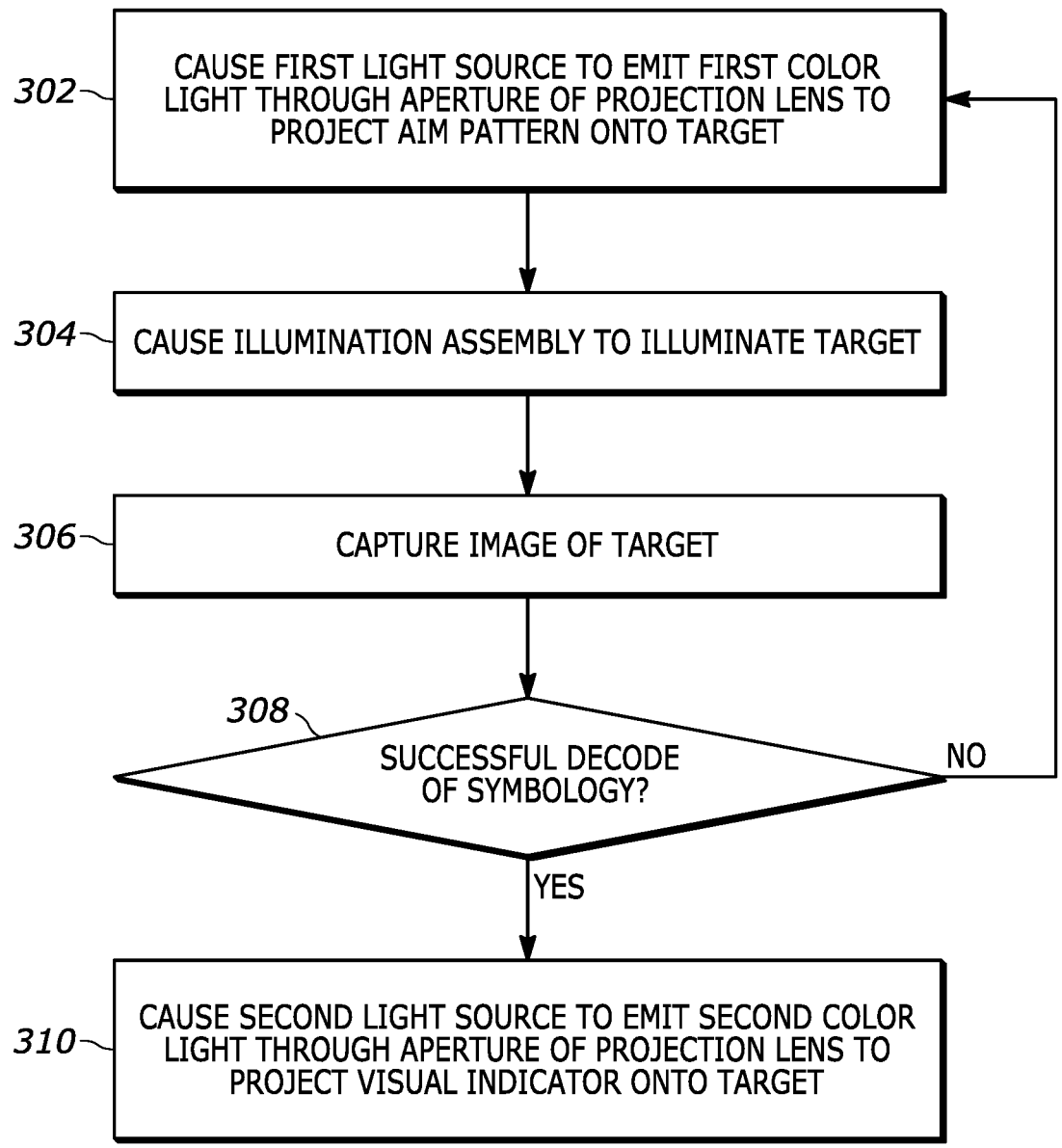
FIG. 3 illustrates a flow diagram representative of an exemplary method of operating a barcode reader implementing a combined visual indicator assembly, in accordance with an embodiment of the present invention Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

FIG. 3 illustrates a flow diagram representative of an exemplary method 300 of operating a barcode reader implementing a combined visual indicator assembly, in accordance with an embodiment of the present invention. The method 300 can be implemented as a set of instructions stored on a computer-readable memory and executable on one or more processors.

At block 302, prior to an imaging assembly of the barcode reader capturing an image of a target (e.g., a barcode or other symbology), at least one processor of the barcode reader may cause a first light source (e.g., an LED light source) to emit a first color light through a projection lens (e.g., through an aperture of the projection lens) to project an aim pattern onto the target. In particular, the first light source may emit the first color light such that an optical element directs the first light from the first light source to the projection lens.

At block 304, at least one processor of the barcode reader may cause an illumination assembly to illuminate the target.

At block 306, at least one processor of the barcode reader may cause an imaging assembly to capture an image of the target.

At block 308, at least one processor of the barcode reader may attempt to decode the barcode or other symbology in the captured image. If the target is not successfully decoded (block 308, NO), the method may repeat from block 302 through block 308 until a captured image of the target is successfully decoded. If the target is successfully decoded (block 308, YES), the method 300 may proceed to block 310.

At block 310, subsequent to the at least one processor successfully decoding a symbology in the captured image of the target, the processor of the barcode reader may cause a second light source (e.g., an LED light source) to emit a second color light (e.g., a different color from the first color light emitted by the first light source) through the projection lens (e.g., through the aperture of the projection lens) to project a visual indicator of the successful decode onto the target. In particular, the second light source may emit the second color light such that the same optical element that directs the first light from the first light source to the projection lens also directs the second light from the second light source to the projection lens.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A barcode reader, comprising:
an illumination assembly configured to illuminate a target;
an imaging assembly configured to capture an image of the target;
a visual indicator assembly, wherein the visual indicator assembly includes:
a projection lens;
a first light source, having a first color, configured to emit a first light through the projection lens to project an aim pattern onto the target;
a second light source, having a second color, configured to emit a second light through the projection lens to project a visual indicator onto the target; and
an optical element configured to direct the first light from the first light source to the projection lens and configured to direct the second light from the second light source to the projection lens;
a memory configured to store computer executable instructions; and
at least one processor configured to interface with the illumination assembly, the imaging assembly, the visual indicator assembly, and the memory, and configured to execute the computer executable instructions to cause the at least one processor to:
cause the first light source to emit light prior to the imaging assembly capturing the image of the target; and
cause the second light source to emit light subsequent to the at least one processor successfully decoding a symbology in the captured image.

2. The barcode reader of claim 1, wherein one or more of the first light source or the second light source are light emitting diode (LED) light sources.

3. The barcode reader of claim 1, wherein the aim pattern and the visual indicator are projected to substantially same position on the target.

4. The barcode reader of claim 1, wherein the first light source and the second light source are each configured to emit light having a brightness of 10 lumens or greater.

5. The barcode reader of claim 1, wherein a light path of the first light has a first axis, and wherein a light path of the second light has a second axis, and wherein the optical element redirects the light path of the first light and the light path of the second light such that upon passage through the optical element, the first axis and the second axis are substantially coaxial.

6. The barcode reader of claim 1, wherein the visual indicator assembly further includes at least one aperture on one or more of a light path of the first light or a light path of the second light.

7. A barcode reader, comprising:
an illumination assembly configured to illuminate a target;
an imaging assembly configured to capture an image of the target;
a visual indicator assembly, wherein the visual indicator assembly includes:
a projection lens;
a first light source configured to emit a first light through the projection lens to project an aim pattern onto the target;
a second light source configured to emit a second light through the projection lens to project a visual indicator onto the target; and
an optical element configured to direct the first light from the first light source to the projection lens and configured to direct the second light from the second light source to the projection lens,
wherein the visual indicator includes an aperture on a light path of the second light;
a memory configured to store computer executable instructions; and
at least one processor configured to interface with the illumination assembly, the imaging assembly, the visual indicator assembly, and the memory, and configured to execute the computer executable instructions to cause the at least one processor to:
cause the first light source to emit light prior to the imaging assembly capturing the image of the target; and
cause the second light source to emit light subsequent to the at least one processor successfully decoding a symbology in the captured image.

8. The barcode reader of claim 7, wherein the aperture is a visual indicator aperture, and wherein the visual indicator assembly further includes an aim pattern aperture on a light path of the first light, the visual indicator aperture having a first shape and the aim pattern aperture having a second shape, the first shape being different from the second shape.

9. The barcode reader of claim 7, wherein the first light source has a first color and wherein the second light source has a second color, the first color being different from the second color.

10. The barcode reader of claim 7, wherein one or more of the first light source or the second light source are light emitting diode (LED) light sources.

11. The barcode reader of claim 7, wherein the aim pattern and the visual indicator are projected to substantially same position on the target.

12. The barcode reader of claim 7, wherein the first light source and the second light source are each configured to emit light having a brightness of 10 lumens or greater.

13. The barcode reader of claim 7, wherein a light path of the first light has a first axis, and wherein a light path of the second light has a second axis, and wherein the optical element redirects the light path of the first light and the light path of the second light such that upon passage through the optical element, the first axis and the second axis are substantially coaxial.

14. A method of operating a barcode reader comprising:
emitting a first light prior to an imaging assembly capturing an image of a target appearing within a field of view (FOV) of the barcode reader, the first light having a first optical characteristic;
emitting a second light subsequent to the imaging assembly capturing the image of the target appearing within the FOV of the barcode reader, the second light having a second optical characteristic that is different from the first optical characteristic,
the first light being emitted from a first light source and being passed from the first light source to a projection lens via an optical element, the second light being emitted from a second light source and being passed from the second light source to the projection lens via the optical element, the optical element being configured to direct the first light from the first light source to the projection lens and configured to direct the second light from the second light source to the projection lens.

* * * * *